(12) United States Patent
Tamura et al.

(10) Patent No.: US 11,244,562 B2
(45) Date of Patent: Feb. 8, 2022

(54) INFORMATION PROCESSING APPARATUS, INFORMATION PROCESSING METHOD AND RECORDING MEDIUM

(71) Applicant: Panasonic Intellectual Property Management Co., Ltd., Osaka (JP)

(72) Inventors: Hideki Tamura, Kanagawa (JP); Motoyasu Taguchi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/001,102

(22) Filed: Aug. 24, 2020

(65) Prior Publication Data
US 2021/0065538 A1 Mar. 4, 2021

(30) Foreign Application Priority Data

Aug. 26, 2019 (JP) .............................. JP2019-153501

(51) Int. Cl.
*G08G 1/005* (2006.01)
*G06K 9/00* (2006.01)
*G08G 1/16* (2006.01)

(52) U.S. Cl.
CPC ......... *G08G 1/005* (2013.01); *G06K 9/00711* (2013.01); *G08G 1/166* (2013.01); *G06K 2009/00738* (2013.01)

(58) Field of Classification Search
CPC .... G08G 1/005; G08G 1/166; G06K 9/00711; G06K 2009/00738; B60W 30/00; B60Q 1/2611; B60Q 1/2615; B60Q 1/44; B60Q 1/26; B60B 50/0097
See application file for complete search history.

(56) References Cited

U.S. PATENT DOCUMENTS

| | | | |
|---|---|---|---|
| 2004/0207519 A1* | 10/2004 | Tracy | A61H 3/068 340/467 |
| 2015/0046054 A1* | 2/2015 | Takahashi | B60T 8/58 701/70 |
| 2017/0240096 A1* | 8/2017 | Ross | G08G 1/0955 |
| 2017/0240098 A1* | 8/2017 | Sweeney | B60Q 1/50 |
| 2018/0319325 A1* | 11/2018 | Tatara | B60Q 1/442 |
| 2018/0326982 A1* | 11/2018 | Paris | G05D 1/0088 |
| 2020/0001779 A1* | 1/2020 | Alexander | G06K 9/00825 |

(Continued)

FOREIGN PATENT DOCUMENTS

JP 2015-143093 8/2015

*Primary Examiner* — An T Nguyen

(74) *Attorney, Agent, or Firm* — Greenblum & Bernstein, P.L.C.

(57) ABSTRACT

Provided are an information processing apparatus, an information processing method, and a recording medium that allow a pedestrian or a bicycle to cross a crosswalk pattern projected by a vehicle more safely. The information processing apparatus includes: a controller that controls a notification to be made by a notification apparatus that prompts a notification target person to cross; and an intention discriminator that discriminates an intention of crossing of the notification target person with respect to the notification. The controller controls the notification apparatus to stop the notification in a case where the intention discriminator discriminates that the notification target person has no intention of crossing.

9 Claims, 8 Drawing Sheets

(56) References Cited

U.S. PATENT DOCUMENTS

| | | | |
|---|---|---|---|
| 2020/0114813 A1* | 4/2020 | Lujan | B60W 60/0017 |
| 2020/0198534 A1* | 6/2020 | Ito | B60W 50/12 |
| 2021/0065538 A1* | 3/2021 | Tamura | G08G 1/005 |

* cited by examiner

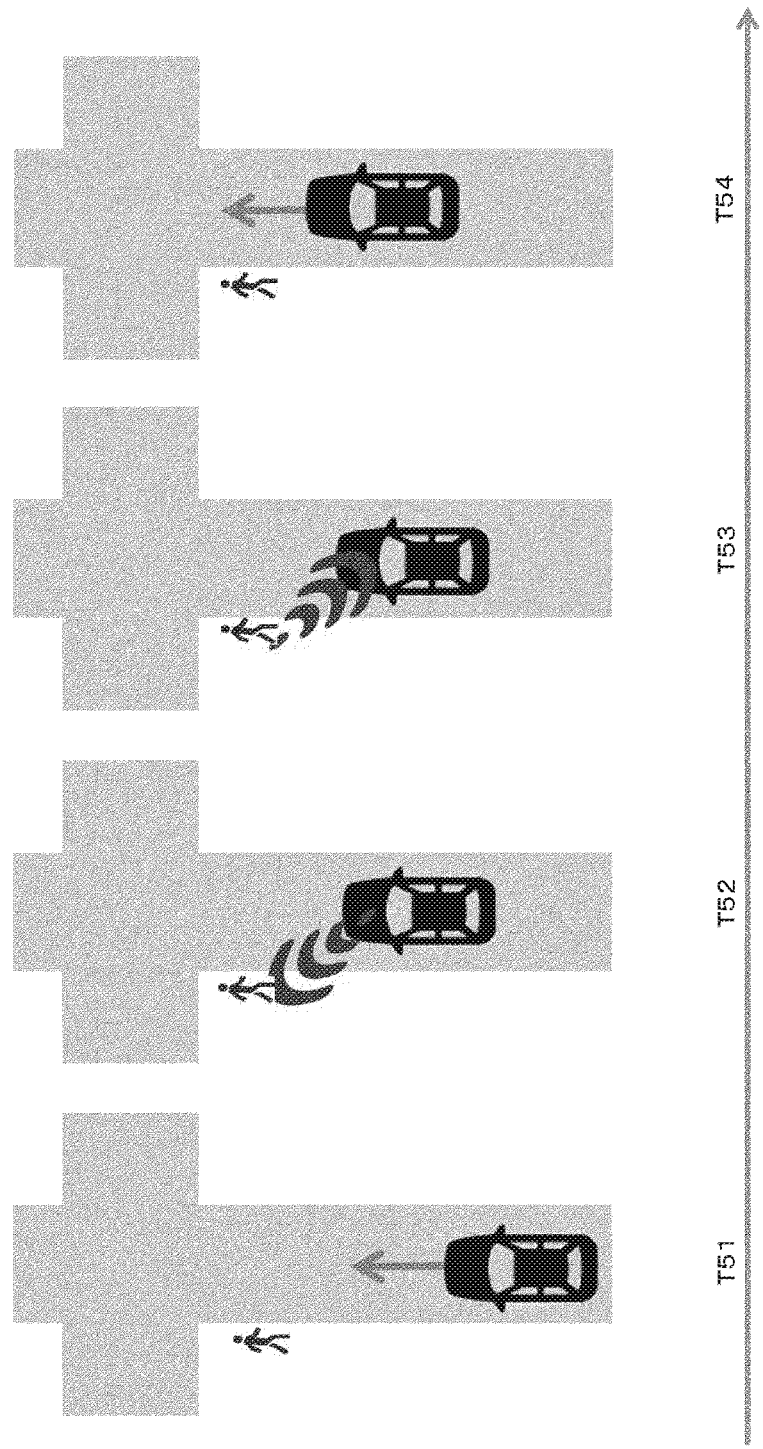

INFORMATION PROCESSING APPARATUS, INFORMATION PROCESSING METHOD AND RECORDING MEDIUM

TECHNICAL FIELD

The present disclosure relates to an information processing apparatus to be mounted on a vehicle or the like that notifies a pedestrian or the like, an information processing method, and a recording medium.

BACKGROUND ART

A known technique assists a pedestrian detected by a vehicle in crossing a road. For example, Patent Literature (hereinafter, referred to as "PTL") 1 discloses the related technique. In a case where the vehicle detects the pedestrian that may cross the road, the technique determines whether or not the pedestrian can cross based on the presence or absence of oncoming vehicles and following vehicles. Further, in a case where the technique determines that the pedestrian can cross the road, a crosswalk pattern is projected on the road to assist the pedestrian in crossing.

CITATION LIST

Patent Literature

PTL 1
Japanese Patent Application Laid-Open No. 2015-143093

SUMMARY OF INVENTION

Technical Problem

PTL 1, however, has room for further improvement for allowing e.g. a pedestrian or a bicycle (hereinafter, referred to as "pedestrian or the like") to cross safely while the crosswalk pattern is being projected. For example, PTL 1 explains that the technique determines whether or not the pedestrian has an intention of crossing the road before the crosswalk pattern is projected. Since the determination algorithm only relies on a result of behavior detection (for example, facing in a direction of the own vehicle for a predetermined time or longer, or the like) of the pedestrian by a camera, it possibly performs an erroneous determination.

Further, it is also impossible to cope with a change in an intention of crossing of the pedestrian (for example, the pedestrian is about to cross, but stops crossing due to a telephone call, or the like) with the configuration that the intension of crossing of the pedestrian is determined in a unilateral way before the crosswalk pattern is projected as described above.

Furthermore, with the widespread of the self-driving vehicles, the configuration of unilaterally determining an intention of crossing of the pedestrian would increase a possibility of leading to an accident.

A non-limiting and exemplary embodiment of the present disclosure contributes to an information processing apparatus, an information processing method, and a recording medium that allow the pedestrian or the like to cross a road more safely.

Solution to Problem

An information processing apparatus according to one aspect of the present disclosure includes: a controller that controls a notification to be made by a notification apparatus that prompts a notification target person to cross; and an intention discriminator that discriminates an intention of crossing of the notification target person with respect to the notification, wherein the controller controls the notification apparatus to stop the notification in a case where the intention discriminator discriminates that the notification target person has no intention of crossing.

An information processing method according to one aspect of the present disclosure includes: controlling a notification to be made by a notification apparatus that prompts a notification target person to cross; and discriminating an intention of crossing of the notification target person with respect to the notification, wherein in the controlling, the notification apparatus is controlled to stop the notification in a case where it is discriminated in the discriminating that the notification target person has no intention of crossing.

A recording medium according to one aspect of the present disclosure is a recording medium recording a program to be executed by a computer, the program comprising: controlling a notification to be made by a notification apparatus that prompts a notification target person to cross, and discriminating an intention of crossing of the notification target person with respect to the notification, wherein in the controlling, the notification apparatus is controlled to stop the notification in a case where it is discriminated in the discriminating that the notification target person has no intention of crossing.

Note that, these comprehensive and specific aspects may be implemented by a system, a method, an integrated circuit, a computer program or a recording medium, and may also be implemented by an arbitrary combination of a system, an apparatus, a method, an integrated circuit, a computer program and a recording medium.

Further advantages and effects of one aspect of the present disclosure become apparent from the specification and the accompanying drawings. Such advantages and/or effects are respectively provided with characteristic described in some embodiments as well as the specification and the accompanying drawings, but not all of them need to be provided to obtain one or more of the same characteristics.

BRIEF DESCRIPTION OF DRAWINGS

FIG. 8 is a diagram illustrating an example of processing images of the projection of the crosswalk pattern according to the present embodiment.

DESCRIPTION OF EMBODIMENTS

Hereinafter, an embodiment of the present disclosure will be described in detail with reference to the accompanying drawings as appropriate. However, more detailed description than necessary may be omitted. For example, detailed descriptions of already well-known matters and repeated descriptions for substantially the same configuration may be omitted. This is to prevent the following description from becoming unnecessarily redundant and to facilitate understanding by those skilled in the art.

Note that, the accompanying drawings and the following description are provided so that those skilled in the art understand the present embodiment sufficiently, and are not intended to limit the subject matters recited in the claims.

Figure 1:
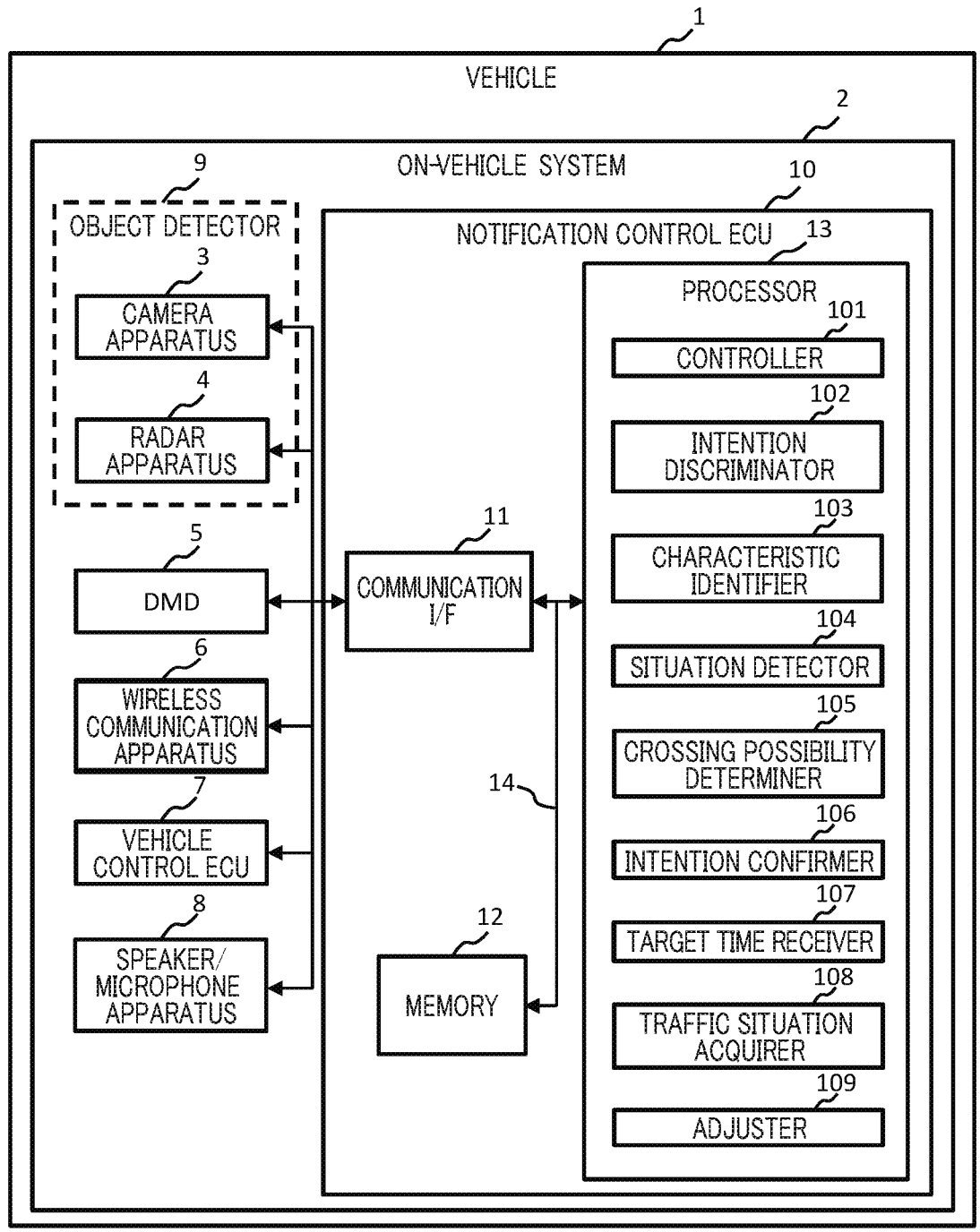
FIG. 1 is a diagram illustrating a configuration example of an on-vehicle system according to the present embodiment.

FIG. 1 is a diagram illustrating a configuration example of an on-vehicle system according to the present embodiment.

On-vehicle system 2 to be mounted on vehicle 1 includes, for example, camera apparatus 3, radar apparatus 4, DMD (Digital Micromirror Device) 5, wireless communication apparatus 6, vehicle control ECU (Electronic Control Unit) 7, speaker/microphone apparatus 8, and notification control ECU 10.

Camera apparatus 3 is installed in front of vehicle 1, for example, and detects an object (e.g. a person, a bicycle, any other vehicle or an obstacle) in front of vehicle 1 based on a captured video image. Radar apparatus 4 is installed, for example, in front, rear, left and right of vehicle 1, transmits electromagnetic waves (for example, millimeter waves), and detects an object around vehicle 1 based on reflected waves thereof.

Note that, camera apparatus 3 and radar apparatus 4 are examples of apparatuses for detecting an object around vehicle 1, and vehicle 1 may detect an object with apparatuses other than camera apparatus 3 and radar apparatus 4. Further, apparatuses that detect an object, such as camera apparatus 3 and radar apparatus 4, may be referred to as object detector 9. In a case where object detector 9 detects an object, object detector 9 notifies notification control ECU 10 of detection information including a detection result.

DMD 5 (an example of a light irradiation apparatus) is an apparatus that is installed, for example, in the vicinity of a bumper of vehicle 1, and irradiates a road with light representing e.g. a pattern or a letter. For example, DMD 5 irradiates a road surface in front of vehicle 1 with light representing a pattern of a crosswalk (hereinafter, referred to as "crosswalk pattern") or the like based on control of notification control ECU 10.

Wireless communication apparatus 6 is an apparatus for communicating with the outside such as another vehicle, a roadside machine and a cloud server. For example, wireless communication apparatus 6 performs inter-vehicle wireless communication with another vehicle based on the standard for V2V (Vehicle to Vehicle).

Vehicle control ECU 7 is an apparatus for controlling operation of vehicle 1. For example, vehicle control ECU 7 controls steering, acceleration, braking, and the like of vehicle 1. In the present embodiment, vehicle control ECU 7 restrains an erroneous start of vehicle 1 based on the control of notification control ECU 10. That is, vehicle control ECU 7 restrains a start of vehicle 1 when the driver accidentally presses the accelerator.

Speaker/microphone apparatus 8 (an example of a voice output apparatus) is capable of outputting a voice to the periphery of vehicle 1 or collecting a voice around vehicle 1. The voice to be output by speaker/microphone apparatus 8 may be, for example, a voice to be reproduced based on a voice signal stored in advance in memory 12.

Memory 12 stores voice signals corresponding to various voices to be reproduced according to the situation. For example, controller 101 to be described later may select and reproduce an appropriate voice signal according to the situation. Further, memory 12 stores text information corresponding to various voices to be reproduced according to the situation. Controller 101 may be configured, without any particular limitation, to select appropriate text information according to the situation to vocally reproduce the contents of the selected text.

Notification control ECU 10 is an apparatus for controlling a notification to the pedestrian or the like and another vehicle from vehicle 1. Notification control ECU 10 includes, for example, communication I/F 11, memory 12, and processor 13. Communication I/F 11, memory 12 and processor 13 are connected by internal bus 14 capable of bidirectional communication. Note that, notification control ECU 10 is an example of the information processing apparatus according to the present embodiment.

Communication I/F 11 transmits and receives data to and from each of camera apparatus 3, radar apparatus 4, DMD 5, wireless communication apparatus 6, and vehicle control ECU 7 via an in-vehicle network. The in-vehicle network may be configured by either wire or wireless, or a combination thereof. Further, the in-vehicle network may be configured at least partially by a CAN (Controller Area Network).

Memory 12 holds computer e.g. programs and data that are executed by processor 13. Memory 12 may be configured by a volatile memory or a non-volatile memory, or a combination thereof.

Processor 13 implements various functions of notification control ECU 10 by reading a computer program from memory 12 to execute the computer program. Processor 13 may be expressed as e.g. a CPU (Central Processing Unit), an LSI (Large Scale Integration) or a control unit.

For example, processor 13 executes a computer program(s) read from memory 12 to implement a function(s) concerning controller 101, intention discriminator 102, characteristic identifier 103, situation detector 104, crossing possibility determiner 105, intention confirmer 106, target time receiver 107, traffic situation acquirer 108, and/or adjuster 109.

Controller 101 controls a notification to be made by a notification apparatus in order to prompt a notification target person to cross. The notification target person discussed here is not limited to a pedestrian, but encompasses, without any particular limitation, a person riding a bicycle (encompassing a one-wheeler, a two-wheeler, a three-wheeler or the like), a wheelchair or any other personal mobility, regardless of being driven electrically or by human power. Hereinafter, a notification target candidate or the notification target person (details of which will be described later) may be referred to as "pedestrian or the like".

Further, although a case where the notification apparatus is a light irradiation apparatus such as DMD 5 will be described as an example in the present embodiment, the present invention is not limited thereto. For example, the notification apparatus may be a voice output apparatus such as a speaker. Alternatively, the notification apparatus may be, for example, an apparatus that transmits information by electromagnetic waves or the like to a terminal such as a smartphone carried by the pedestrian or the like.

Controller 101 controls the notification to be made by the notification apparatus in accordance with various information (hereinafter, referred to as "various received information") received from intention discriminator 102, characteristic identifier 103, situation detector 104, crossing possibility determiner 105, intention confirmer 106, target time receiver 107, traffic situation acquirer 108, adjuster 109 or the like.

Controller 101 takes the various received information into comprehensive consideration, and controls DMD 5, for example, based on a determination result regarding whether or not projection of the crosswalk pattern is necessary, to project the crosswalk pattern in front of vehicle 1 or to stop the projection of the crosswalk pattern. In addition, controller 101 performs various controls as described later.

Note that, controller 101 may be configured to control vehicle control ECU 7 to restrain an erroneous start of vehicle 1, for example, during the projection of the crosswalk pattern (hereinafter, referred to as "during the projection period of the crosswalk pattern") by DMD 5. For example, controller 101 instructs vehicle control ECU 7 not to start vehicle 1 even when the driver presses the accelerator during the projection period of the crosswalk pattern. Thus, it is possible to restrain vehicle 1 from starting erroneously while the pedestrian or the like is crossing the crosswalk pattern during projection.

Further, controller 101 may also be configured to notify a subsequent vehicle of vehicle 1 of information indicating that the pedestrian or the like is crossing the crosswalk pattern via wireless communication apparatus 6 during the projection period of the crosswalk pattern.

Intention discriminator 102 discriminates an intention of crossing of the notification target person with respect to the notification to be made by the notification apparatus. For example, intention discriminator 102 discriminates whether or not the pedestrian or the like has an intention of crossing with respect to the projection of the crosswalk pattern by DMD 5. Intention discriminator 102 discriminates whether or not the pedestrian or the like has an intention of crossing, for example, by using an image recognition technique or the like based on an image of the pedestrian or the like to be captured by camera apparatus 3. More specifically, intention discriminator 102 discriminates whether or not the pedestrian or the like is crossing the crosswalk pattern projected by DMD 5 by using an image recognition technique or the like based on an image captured by camera apparatus 3. Then, in a case where it is determined that the pedestrian or the like is crossing the crosswalk pattern, intention discriminator 102 discriminates that the pedestrian has an intention of crossing.

On the other hand, intention discriminator 102 discriminates that the pedestrian or the like has no intention of crossing in a case where, by using an image recognition technique or the like based on an image captured by camera apparatus 3, it is recognized that a certain period has elapsed without the pedestrian or the like crossing the crosswalk pattern projected by DMD 5 or a gesture of the pedestrian or the like indicating that the pedestrian or the like does not cross is recognized.

Note that, in addition to discriminating whether or not the pedestrian or the like has an intention of crossing based on an image captured by camera apparatus 3, intention discriminator 102 may discriminate whether or not the pedestrian or the like has an intention of crossing, for example, based on a voice of the pedestrian or the like acquired by speaker/microphone apparatus 8. For example, in a case where speaker/microphone apparatus 8 acquires a voice "I will not cross" of a pedestrian, intention discriminator 102 may interpret the meaning of the voice by using a voice recognition technique or the like to discriminate that the pedestrian or the like has no intention of crossing.

Then, in a case where intention discriminator 102 discriminates that the pedestrian or the like has no intention of crossing the projected crosswalk pattern, controller 101 performs control to stop the projection of the crosswalk pattern by DMD 5.

Characteristic identifier 103 identifies a characteristic of the notification target person. Characteristic identifier 103 identifies whether the notification target person is a normal pedestrian, a pedestrian with a walking stick, a blind pedestrian or else, a wheelchair user, a personal mobility user or the like, for example, by using an image recognition technique or the like based on an image captured by camera apparatus 3. Further, characteristic identifier 103 may also utilize a V2P (Vehicle to Pedestrian) technique in addition to the image recognition technique. For example, a blind person, a wheelchair user, a physically handicapped elderly person or the like carries a dedicated terminal, a dedicated smart device terminal or the like that stores traffic-related personal attribute information. Then, vehicle 1 (for example, wireless communication apparatus 6) communicates with these terminals to acquire traffic-related personal attribute information of persons carrying these terminals. Then, characteristic identifier 103 may identify the characteristic of the notification target person based on the attribute information.

Then, controller 101 changes an aspect of the notification in accordance with the characteristic of the notification target person. For example, in a case where characteristic identifier 103 identifies the notification target person as a blind pedestrian, controller 101 may perform a notification using a voice (for example, a voice message with a content that prompts the notification target person to cross) to be output from speaker/microphone apparatus 8 as the notification apparatus, together with the projection of the crosswalk pattern by DMD 5 as the notification apparatus or instead of the projection of the crosswalk pattern.

Situation detector 104 detects a situation in which the notification target person is crossing. Situation detector 104 detects whether the pedestrian or the like is crossing the crosswalk pattern projected by DMD 5, for example, by using an image recognition technique or the like based on an image captured by camera apparatus 3. Note that, situation detector 104 interprets the meaning of a voice (for example, a voice "Please wait a little longer" or the like) of the pedestrian or the like acquired by speaker/microphone apparatus 8 by using a voice recognition technique or the like to detect that the pedestrian or the like is in a situation in which the pedestrian or the like is crossing the crosswalk pattern.

By using the image recognition technique or the voice recognition technique as described above, situation detector 104 is also capable of detecting, for example, that a pedestrian that has started crossing once stops crossing in the middle of the road and returns. That is, situation detector 104 is also capable of detecting a change in a pedestrian's intention of crossing, or the like.

Then, while it is detected based on a detection result by situation detector 104 that the pedestrian or the like is crossing, controller 101 continues the projection of the crosswalk pattern by DMD 5 and/or the notification using a voice from speaker/microphone apparatus 8.

Situation detector 104 may detect that another pedestrian or the like other than the pedestrian or the like recognized as the notification target person is about to cross. For example, situation detector 104 is capable of detecting a situation in which the other pedestrian is about to cross, for example, by the image recognition technique based on an image captured by camera apparatus 3 or by the voice recognition technique based on a voice acquired by speaker/microphone apparatus 8.

Then, while it is detected based on a detection result by situation detector 104 that the other pedestrian or the like is crossing, controller 101 continues the projection of the crosswalk pattern by DMD 5 and/or the notification using a voice from speaker/microphone apparatus 8.

Crossing possibility determiner 105 determines a possibility of crossing by the pedestrian or the like detected as a notification target candidate by object detector 9. While vehicle 1 is running or the like, object detector 9 detects the pedestrian or the like as the notification target candidate based on an image or the like captured by camera apparatus 3. The notification target candidate discussed here is the pedestrian or the like that becomes a candidate to be notified for being prompted to cross by the projection of the crosswalk pattern by DMD 5 or by output of a voice from speaker/microphone apparatus 8. However, this pedestrian or the like is only a candidate to be notified, and it is decided based on a determination result by crossing possibility determiner 105 whether or not the pedestrian or the like actually becomes the notification target person.

Accordingly, crossing possibility determiner 105 determines whether or not there is a possibility of crossing by the pedestrian detected as the notification target candidate. For example, crossing possibility determiner 105 determines a possibility of crossing by the notification target candidate by recognizing and analyzing an image or the like captured by camera apparatus 3. For example, in a case where the notification target candidate sticks out from a side strip of a road by more than a predetermined distance or faces in a direction of the own vehicle (vehicle 1) for a predetermined time as a result of analyzing an image captured by camera apparatus 3, crossing possibility determiner 105 may determine that there is a possibility of crossing. In a case where crossing possibility determiner 105 determines that there is a possibility of crossing, vehicle 1 stops in the vicinity of the position of the notification target candidate by control by vehicle control ECU 7. Further, crossing possibility determiner 105 decides the notification target candidate who is determined to have a possibility of crossing as the notification target person.

Intention confirmer 106 reconfirms an intention of crossing of the pedestrian or the like assigned as the notification target person as a result of the determination by crossing possibility determiner 105 that there is a possibility of crossing. Intention confirmer 106 may ask the notification target person about an intention of crossing by outputting a voice message "Do you cross?" from speaker/microphone apparatus 8, for example. Furthermore, in a case where speaker/microphone apparatus 8 acquires a voice "I will cross!" of the notification target person, for example, intention confirmer 106 is capable of confirming that the notification target person has an intention of crossing.

For example, in a case where a gesture indicating "I will cross!" by the notification target person is recognized based on an image captured by camera apparatus 3, intention confirmer 106 may be configured, without any particular limitation, to confirm that the notification target person has an intention of crossing.

Then, in a case where an intention of crossing of the notification target person can be confirmed as a result of the intention confirmation by intention confirmer 106, controller 101 executes the notification (for example, the projection of the crosswalk pattern by DMD 5 or the like) to the notification target person, for example.

Memory 12 stores at least one of a frequency that crossing possibility determiner 105 performs determination and a threshold value for determining that there is a possibility of crossing with respect to an index value used in the determination. As the frequency, it is possible to set an arbitrary value, for example, every 10 seconds, every 1 minute, every 5 minutes, every 10 minutes, or the like. The index value used in the determination may be, for example, a value indicative of a probability representing a possibility of crossing. For example, when it is judged that there is a possibility of crossing in the case of a probability of 90% or higher, a value of 90% is set as the threshold value.

Crossing possibility determiner 105 executes processing of determining a possibility of crossing by the notification target candidate by using at least one of the frequency and the threshold value stored in memory 12. The frequency and the threshold value can be arbitrarily set by a user via an input interface configured as a car navigation apparatus or the like (not illustrated). For example, in a case where a sudden sick person rides in vehicle 1, it is possible to restrain vehicle 1 from frequently stopping by lowering the frequency of determination, by crossing possibility determiner 105, and/or by raising the threshold value for determining that there is a possibility of crossing.

Target time receiver 107 receives an input of a target time of arrival for vehicle 1 to arrive at a destination. Vehicle 1 includes, for example, a car navigation apparatus (not illustrated), and the car navigation apparatus functions as target time receiver 107. The user inputs the target time of arrival at the destination via the car navigation apparatus or the like.

Traffic situation acquirer 108 acquires information on traffic situation around a route to the destination. As the information on traffic situation, traffic situation acquirer 108 is capable of acquiring, for example, traffic jam information, traffic regulation information, accident information, congestion information or the like via wireless communication apparatus 6. The above-described car navigation apparatus may function as traffic situation acquirer 108.

Adjuster 109 adjusts at least one value of the frequency and the threshold value by using at least one of the target time of arrival received by target time receiver 107 and the information on traffic situation acquired by traffic situation acquirer 108. For example, adjuster 109 executes a navigation simulation to the destination in consideration of the information on traffic situation to calculate an estimated time of arrival. Then, adjuster 109 is capable of adjusting the frequency and/or the threshold value by comparing the estimated time of arrival with the target time of arrival. For example, in a case where there is not much margin (in the case of less than a predetermined time difference) as a result of the comparison between the target time of arrival and the estimated time of arrival, adjuster 109 adjusts vehicle 1 not to stop frequently by lowering the frequency and/or by raising the threshold value.

(First Example of Projection Control of Crosswalk Pattern)

Figure 2:
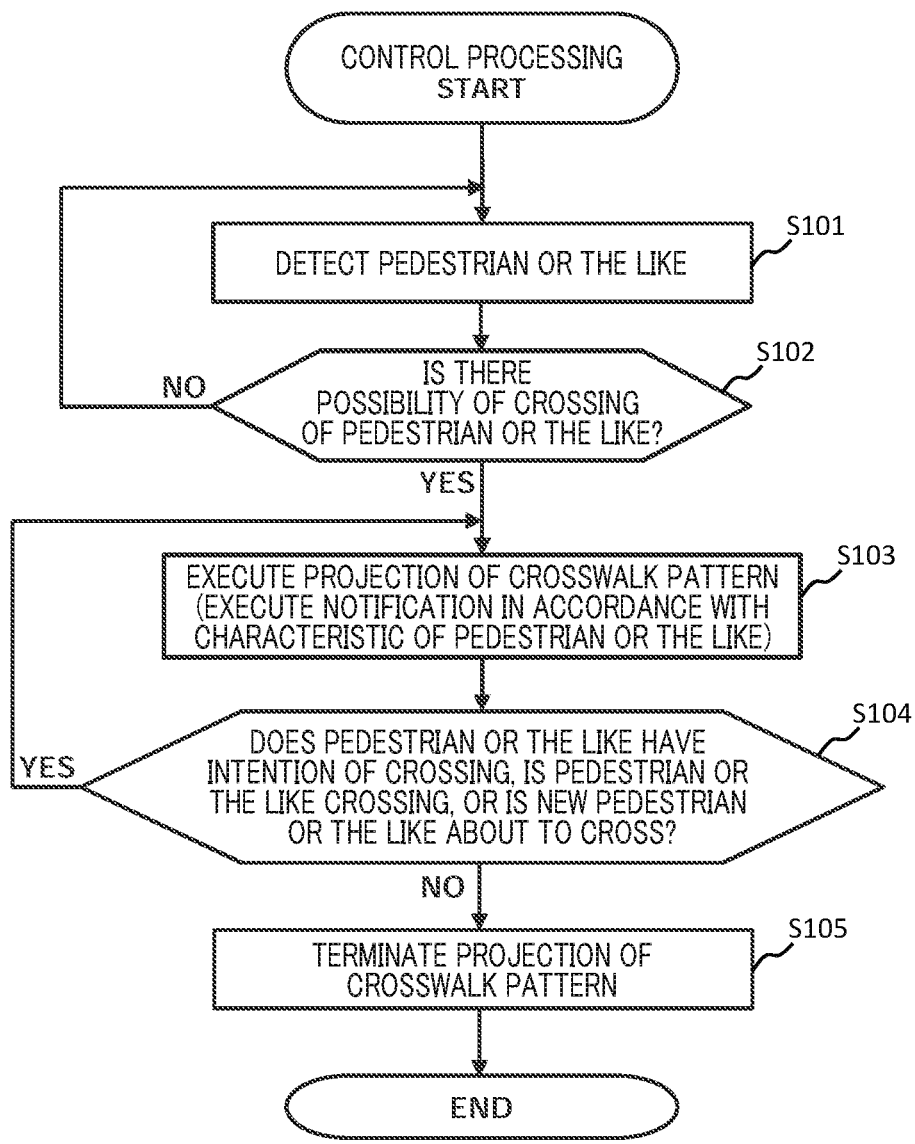
FIG. 2 is a diagram for explaining processing of a first example of projection control of a crosswalk pattern according to the present embodiment.

Next, processing of a first example of projection control of a crosswalk pattern will be described with reference to a flowchart of FIG. 2. Note that, the processing to be described below is appropriately executed while the power supply of vehicle 1 is running, such as while vehicle 1 is running or stops. FIG. 2 is a diagram for explaining the processing of the first example of the projection control of the crosswalk pattern according to the present embodiment.

While vehicle 1 is running or the like, object detector 9 detects the pedestrian or the like (S101). For example, object detector 9 detects the pedestrian or the like as the notification target candidate based on an image or the like captured by camera apparatus 3 constituting object detector 9. Note that, in addition to camera apparatus 3, a configuration in which the pedestrian or the like is detected by radar apparatus 4 may also be possible. Note that, the processing of detecting the pedestrian or the like in S101 is repeated at predetermined time intervals. The time intervals are stored, for example, in memory 12.

When the pedestrian or the like is detected in S101, crossing possibility determiner 105 determines whether or not there is a possibility of crossing by the pedestrian or the like detected as the notification target candidate by object detector 9 (S102). For example, crossing possibility determiner 105 determines whether or not there is a possibility of crossing by the pedestrian or the like by recognizing and analyzing an image or the like captured by camera apparatus 3.

Note that, as described above, the frequency that crossing possibility determiner 105 performs determination and the threshold value for determining that there is a possibility of crossing with respect to the index value used in the determination are stored in memory 12. Crossing possibility determiner 105 determines whether or not there is a possibility of crossing by the pedestrian or the like based on the frequency and the threshold value stored in memory 12.

In a case where crossing possibility determiner 105 determines that there is no possibility of crossing by the pedestrian or the like (S102: NO), the flow returns to S101. Then, object detector 9 performs the pedestrian detection processing in S101.

In a case where crossing possibility determiner 105 determines that there is a possibility of crossing by the pedestrian or the like (S102: YES), the pedestrian or the like is assigned as the notification target person. Then, controller 101 executes the projection of the crosswalk pattern in front of vehicle 1, for example, by controlling DMD 5 as the notification apparatus (S103). Here, in a case where vehicle 1 is running, vehicle 1 stops, and the processing of the projection of the crosswalk pattern in S103 is executed. Note that, controller 101 may also perform a notification to prompt the crossing by a voice to be output from speaker/microphone apparatus 8.

When controller 101 executes the projection of the crosswalk pattern, a notification in accordance with a characteristic of the pedestrian or the like may be performed. Characteristic identifier 103 identifies whether the pedestrian or the like is a normal pedestrian or a blind pedestrian, or the like by using an image recognition technique based on an image captured by camera apparatus 3, for example.

For example, in a case where characteristic identifier 103 identifies that the pedestrian or the like is a blind pedestrian, controller 101 may perform a notification using a voice (for example, a voice message with a content that prompts the pedestrian or the like to cross) to be output from speaker/microphone apparatus 8 as the notification apparatus, together with the projection of the crosswalk pattern from DMD 5 as the notification apparatus or instead of the projection.

When controller 101 executes the projection of the crosswalk pattern, intention discriminator 102 discriminates an intention of crossing of the pedestrian or the like with respect to the notification to be made by the notification apparatus (S104). For example, intention discriminator 102 discriminates whether or not the pedestrian or the like has an intention of crossing with respect to the projection of the crosswalk pattern by DMD 5. Intention discriminator 102 discriminates whether or not the pedestrian or the like has an intention of crossing based on an image of the pedestrian or the like to be captured by camera apparatus 3.

Further, in S104, situation detector 104 detects the situation in which the pedestrian or the like is crossing. Situation detector 104 detects whether or not the pedestrian or the like is crossing the crosswalk pattern projected by DMD 5, for example, by using an image recognition technique based on an image captured by camera apparatus 3.

Furthermore, in S104, situation detector 104 detects whether or not a pedestrian or the like (hereinafter, referred to as "new pedestrian") other than the pedestrian or the like recognized as the notification target person is about to cross.

In S104, in a case where intention discriminator 102 discriminates that the pedestrian or the like has an intention of crossing, in a case where situation detector 104 detects that the pedestrian or the like is crossing the crosswalk pattern projected by DMD 5, or in a case where situation detector 104 detects that the new pedestrian or the like is about to cross (S104: YES), the flow returns to S103. Then, controller 101 continues to execute the projection of the crosswalk pattern.

In S104, in a case where intention discriminator 102 discriminates that the pedestrian or the like has no intention of crossing, in a case where situation detector 104 detects that the pedestrian or the like stops crossing the crosswalk pattern projected by DMD 5, or in a case where situation detector 104 does not detect that the new pedestrian or the like is about to cross (S104: NO), controller 101 terminates the projection of the crosswalk pattern (S105).

Note that, the processing in which target time receiver 107 receives the input of the target time of arrival described above, the processing in which traffic situation acquirer 108 acquires the information on traffic situation described above, or the processing in which adjuster 109 adjusts the frequency and/or the threshold value as described above by using at least one of the target time of arrival and the information on traffic situation may also be executed as processing in a previous stage of S101.

(Second Example of Projection Control of Crosswalk Pattern)

Figure 3:
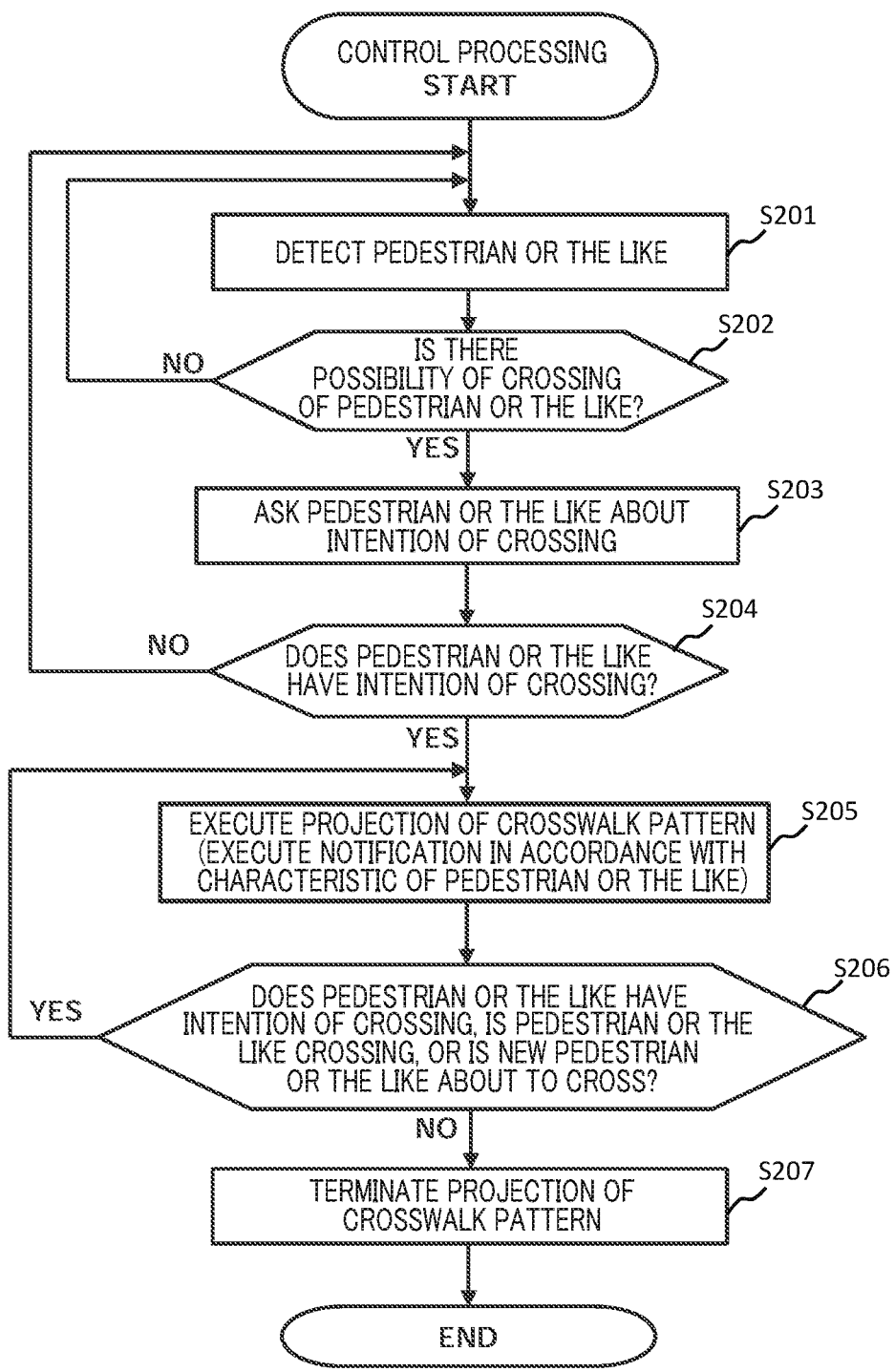
FIG. 3 is a diagram for explaining processing of a second example of the projection control of the crosswalk pattern according to the present embodiment.

Next, processing of a second example of the projection control of the crosswalk pattern will be described with reference to a flowchart of FIG. 3. Note that, as with the first example described above, the processing to be described below is appropriately executed while the power supply of vehicle 1 is running, such as while vehicle 1 is running or stops. FIG. 3 is a diagram for explaining the processing of the second example of the projection control of the crosswalk pattern according to the present embodiment.

While vehicle 1 is running or the like, object detector 9 detects the pedestrian or the like (S201). For example, object detector 9 detects the pedestrian or the like as the notification target candidate based on an image or the like captured by camera apparatus 3 constituting object detector 9. Note that, in addition to camera apparatus 3, a configuration in which the pedestrian or the like is detected by radar apparatus 4 may also be possible. Note that, the processing of detecting the pedestrian or the like in S201 is repeated at predetermined time intervals. The time intervals are stored, for example, in memory 12.

When the pedestrian or the like is detected in S201, crossing possibility determiner 105 determines whether or not there is a possibility of crossing by the pedestrian or the like detected as the notification target candidate by object detector 9 (S202). For example, crossing possibility determiner 105 determines whether or not there is a possibility of crossing by the pedestrian or the like by recognizing and analyzing an image or the like captured by camera apparatus 3.

Note that, as described above, the frequency that crossing possibility determiner 105 performs determination and the threshold value for determining that there is a possibility of crossing as the index value used in the determination are stored in memory 12. Crossing possibility determiner 105 determines whether or not there is a possibility of crossing by the pedestrian or the like based on the frequency and the threshold value stored in memory 12.

In a case where crossing possibility determiner 105 determines that there is no possibility of crossing by the pedestrian or the like (S202: NO), the flow returns to S201. Then, object detector 9 performs the pedestrian detection processing in S201.

In a case where crossing possibility determiner 105 determines that there is a possibility of crossing by the pedestrian or the like (S202: YES), the pedestrian or the like is assigned as the notification target person. Then, intention confirmer 106 asks the pedestrian or the like assigned as the notification target person about an intention of crossing (S203).

For example, intention confirmer 106 may output a voice message "Do you cross?" from speaker/microphone apparatus 8 to ask the pedestrian or the like about an intention of crossing.

Intention confirmer 106 determines whether or not the pedestrian or the like has an intention of crossing (S204).

For example, in a case where speaker/microphone apparatus 8 acquires a voice "I will cross!" of the pedestrian or the like, intention confirmer 106 determines that the pedestrian or the like has an intention of crossing. Here, in a case where vehicle 1 is running, vehicle 1 stops, and processing of confirming an intention of crossing in S203 is executed.

In a case where intention confirmer 106 cannot confirm an intention of crossing of the pedestrian or the like (S204: NO), the flow returns to S201. Then, object detector 9 performs the pedestrian detection processing in S201.

In a case where intention confirmer 106 can confirm an intention of crossing of the pedestrian or the like (S204: YES), controller 101 executes the projection of the crosswalk pattern in front of vehicle 1, for example, by controlling DMD 5 as the notification apparatus (S205). Note that, controller 101 may also perform a notification to prompt the crossing by a voice to be output from speaker/microphone apparatus 8.

When controller 101 executes the projection of the crosswalk pattern, a notification in accordance with a characteristic of the pedestrian or the like may be performed. Characteristic identifier 103 identifies whether the pedestrian or the like is a normal pedestrian or a blind pedestrian, or the like by using an image recognition technique based on an image captured by camera apparatus 3, for example.

For example, in a case where characteristic identifier 103 identifies that the pedestrian or the like is a blind pedestrian, controller 101 may perform a notification using a voice (for example, a voice message with a content that prompts the pedestrian or the like to cross) to be output from speaker/microphone apparatus 8 as the notification apparatus, together with the projection of the crosswalk pattern from DMD 5 as the notification apparatus or instead of the projection.

When controller 101 executes the projection of the crosswalk pattern, intention discriminator 102 discriminates an intention of crossing of the pedestrian or the like with respect to the notification to be made by the notification apparatus (S206). For example, intention discriminator 102 discriminates whether or not the pedestrian or the like has an intention of crossing with respect to the projection of the crosswalk pattern by DMD 5. Intention discriminator 102 discriminates whether or not the pedestrian or the like has an intention of crossing based on an image of the pedestrian or the like to be captured by camera apparatus 3.

Further, situation detector 104 detects the situation in which the pedestrian or the like is crossing in S206. Situation detector 104 detects whether or not the pedestrian or the like is crossing the crosswalk pattern projected by DMD 5, for example, by using an image recognition technique based on an image captured by camera apparatus 3.

Furthermore, in S206, situation detector 104 detects whether or not the new pedestrian (another pedestrian or the like other than the pedestrian or the like recognized as the notification target person) is about to cross.

In S206, in a case where intention discriminator 102 discriminates that the pedestrian or the like has an intention of crossing, in a case where situation detector 104 detects that the pedestrian or the like is crossing the crosswalk pattern projected by DMD 5, or in a case where situation detector 104 detects that the new pedestrian is about to cross (S206: YES), the flow returns to S205. Then, controller 101 continues to execute the projection of the crosswalk pattern.

In S206, in a case where intention discriminator 102 discriminates that the pedestrian or the like has no intention of crossing, in a case where situation detector 104 detects that the pedestrian or the like stops crossing the crosswalk pattern projected by DMD 5, or in a case where situation detector 104 does not detect that the new pedestrian or the like is about to cross (S206: NO), controller 101 terminates the projection of the crosswalk pattern (S207).

Note that, the processing in which target time receiver 107 receives the input of the target time of arrival described above, the processing in which traffic situation acquirer 108 acquires the information on traffic situation described above, or the processing in which adjuster 109 adjusts the frequency and/or the threshold value as described above by using at least one of the target time of arrival and the information on traffic situation may also be executed as processing in a previous stage of S201.

(Processing Images)

Figure 4:
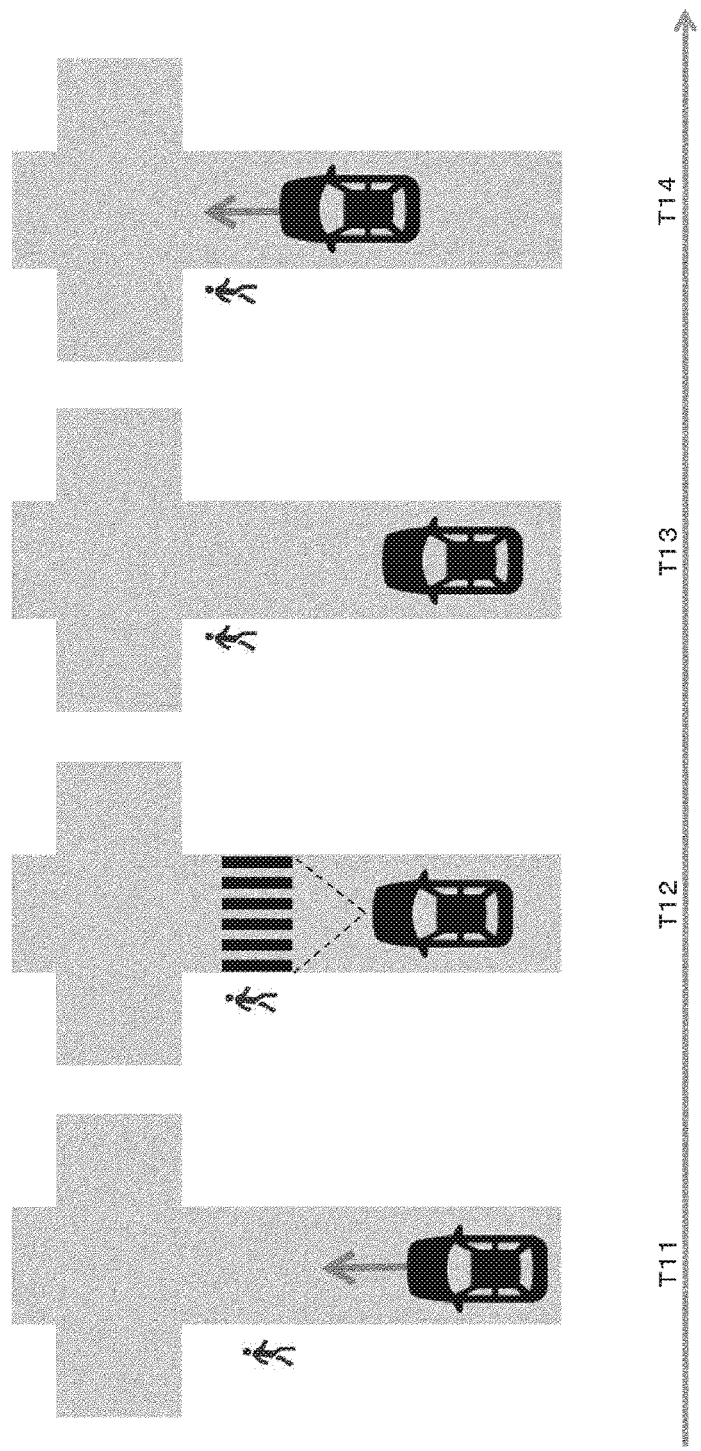
FIG. 4 is a diagram illustrating an example of processing images of projection of the crosswalk pattern according to the present embodiment.

FIG. 4 is a diagram illustrating an example of processing images of the projection of the crosswalk pattern according to the present embodiment. FIG. 4 illustrates processing images in time series in which, after the projection of the crosswalk pattern is started, an intention of crossing of the pedestrian or the like is discriminated based on a reaction (a gesture such as body and/or hand gestures or a conversation by voice) of the pedestrian or the like, and the projection of the crosswalk pattern is controlled according to a result of the discrimination. In FIG. 4, the time axis is assumed to proceed from the left side to the right side in the drawing (the same applies to FIGS. 5 to 8).

In T11, vehicle 1 (which may be referred to as on-vehicle system 2; the same applies hereinafter) detects the pedestrian or the like in motion, for example, and determines whether or not there is a possibility of crossing in front of vehicle 1 by the pedestrian or the like. That is, each processing of S101 and S102 illustrated in FIG. 2 is performed. In a case where it is determined in vehicle 1 that there is a possibility of crossing by the pedestrian or the like, vehicle 1 stops.

In T12, vehicle 1 projects the crosswalk pattern on a road surface as a notification to prompt the pedestrian or the like to cross. Then, vehicle 1 discriminates whether or not the pedestrian or the like has an intention of crossing by recognizing body and/or hand gestures of the pedestrian or the like. That is, each processing of S103 and S104 illustrated in FIG. 2 is executed. In the example illustrated in FIG. 4, it is assumed in T12 that the pedestrian or the like performs a gesture indicating no intension of crossing after the projection of the crosswalk pattern, and that vehicle 1 recognizes that the pedestrian or the like has no intention of crossing.

In T13, vehicle 1 erases the crosswalk pattern. That is, the processing of S105 illustrated in FIG. 2 is executed.

In T14, vehicle 1 runs at reduced speed and passes through in front of the pedestrian or the like.

Note that, in a case where there are a plurality of pedestrians or the like who are determined to have a possibility of crossing, vehicle 1 performs the processing of erasing the crosswalk pattern (S105 in FIG. 2) in a case where all the pedestrians or the like indicate no intention of crossing. Further, in a case where the pedestrian or the like does not explicitly indicate an intention and does not cross either, vehicle 1 performs the processing of erasing the crosswalk pattern (S105 in FIG. 2) after a predetermined time has elapsed.

Figure 5:
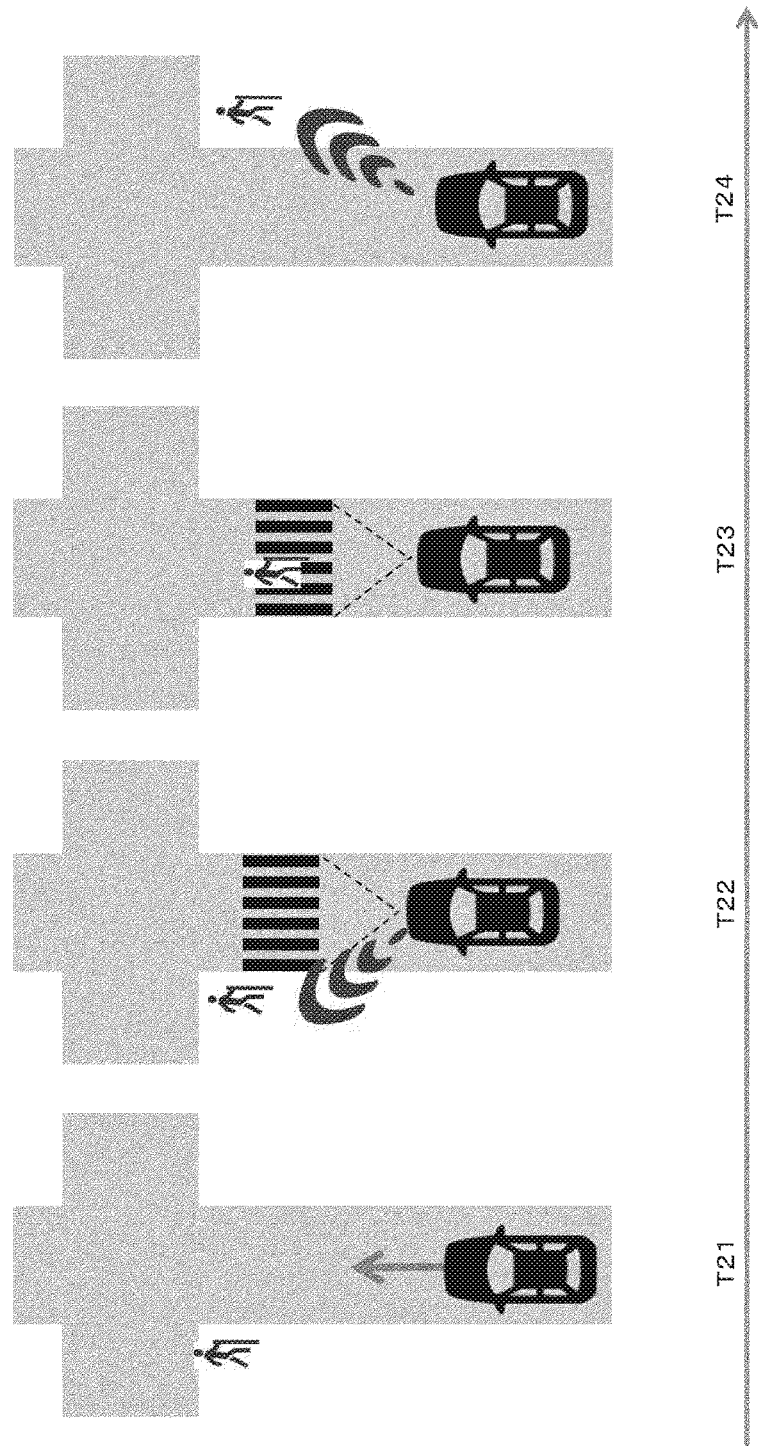
FIG. 5 is a diagram illustrating an example of processing images of the projection of the crosswalk pattern according to the present embodiment.

FIG. 5 is a diagram illustrating an example of processing images of the projection of the crosswalk pattern according to the present embodiment. FIG. 5 illustrates processing images in time series in which, after the projection of the crosswalk pattern is started, a notification to prompt the crossing in accordance with the characteristic of the pedestrian is performed, an intention of crossing of the pedestrian or the like is discriminated, and the projection of the crosswalk pattern is controlled according to a result of the discrimination. In the example illustrated in FIG. 5, the pedestrian or the like is assumed to be a blind pedestrian with a walking stick.

In T21, the same processing as in T11 in FIG. 4 is performed.

In T22, vehicle 1 identifies that the pedestrian or the like has characteristics of being blind and using a walking stick, and performs a notification to prompt the crossing in accordance with the characteristics. In the example illustrated in FIG. 5, vehicle 1 projects the crosswalk pattern and also performs guidance by voice. That is, the processing of S103 illustrated in FIG. 2 is performed. In this case, vehicle 1 may notify the pedestrian or the like of the surrounding situation by voice.

Further, the blind pedestrian with a walking stick is to take more time to cross than a normal pedestrian. In T23, the projection of the crosswalk pattern is continued while the pedestrian or the like is crossing. That is, while the pedestrian or the like is crossing, each processing of S103 and S104 illustrated in FIG. 2 is repeated.

In T24, vehicle 1 notifies the pedestrian or the like by voice of completion of the crossing. Then, vehicle 1 performs the processing of erasing the crosswalk pattern (S105 in FIG. 2). Thereafter, vehicle 1 resumes running.

Figure 6:
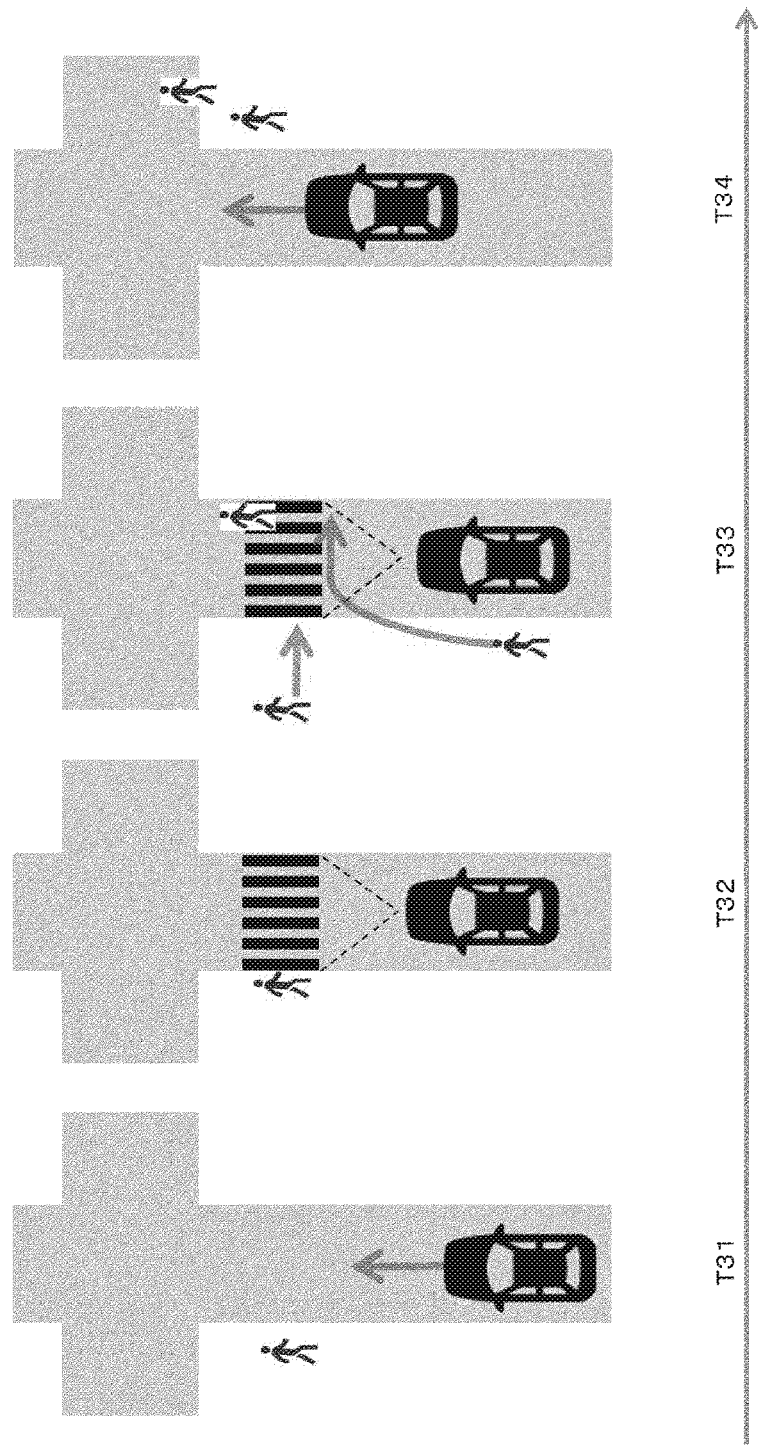
FIG. 6 is a diagram illustrating an example of processing images of the projection of the crosswalk pattern according to the present embodiment.

FIG. 6 is a diagram illustrating an example of images of the projection of the crosswalk pattern according to the present embodiment. FIG. 6 illustrates processing images in time series in which, after the projection of the crosswalk pattern is started, it is detected that the new pedestrian or the like (another pedestrian or the like other than the pedestrian or the like recognized as the notification target person) is about to cross, and the projection of the crosswalk pattern is continued while it is detected that the new pedestrian is crossing.

In T31, the same processing as in T11 in FIG. 4 is performed.

In T32, vehicle 1 projects the crosswalk pattern on a road surface as a notification to prompt the pedestrian or the like to cross. Then, vehicle 1 discriminates whether or not the pedestrian or the like has an intention of crossing by recognizing body and/or hand gestures of the pedestrian or the like. That is, each processing of S103 and S104 illustrated in FIG. 2 is executed. In the example illustrated in FIG. 6, it is assumed in T32 that the pedestrian or the like performs a gesture indicating an intention of crossing after the projection of the crosswalk pattern, and that vehicle 1 recognizes that the pedestrian or the like has an intention of crossing.

In T33, at a timing when the pedestrian is about to finish crossing the crosswalk pattern, vehicle 1 detects the new pedestrian or the like having an intention of crossing. In this case, vehicle 1 is about to terminate the projection of the crosswalk pattern, but detects that the new pedestrian or the like starts crossing from left rear of vehicle 1, so that vehicle 1 suddenly changes the processing and continues the execution of the projection of the crosswalk pattern. That is, the processing of S104 illustrated in FIG. 2 is executed.

In T34, vehicle 1 confirms that the new pedestrian or the like that has started crossing from left rear of vehicle 1 completes the crossing, and performs the processing of erasing the crosswalk pattern (S105 of FIG. 2) in a case where no further new pedestrian or the like is detected.

Figure 7:
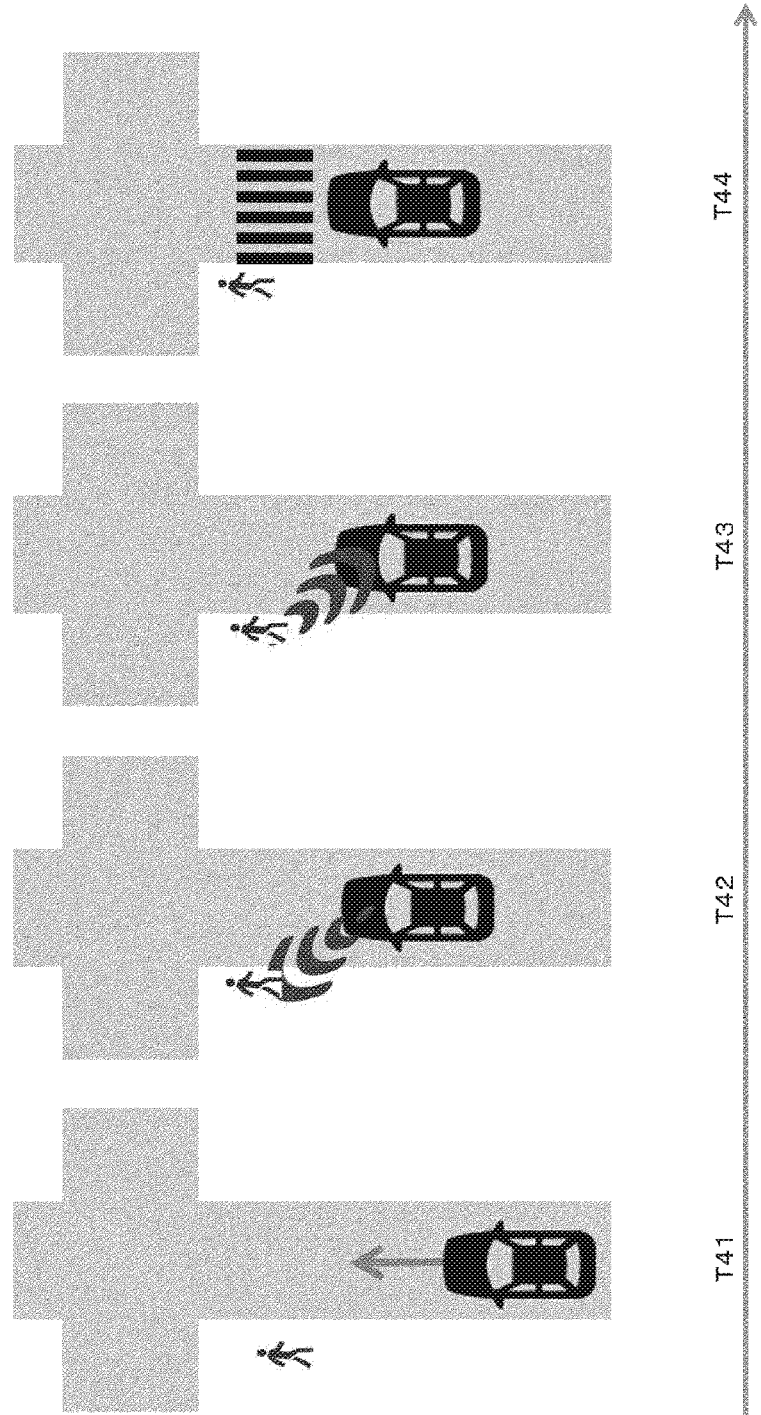
FIG. 7 is a diagram illustrating an example of processing images of the projection of the crosswalk pattern according to the present embodiment.

FIG. 7 is a diagram illustrating an example of images of the projection of the crosswalk pattern according to the present embodiment. FIG. 7 illustrates processing images in time series in which, when the projection of the crosswalk pattern is started, an intention of the pedestrian or the like is confirmed in advance based on a reaction (a gesture such as body and/or hand gestures or a conversation by voice) of the pedestrian or the like, and the projection of the crosswalk pattern is controlled according to a result of the confirmation.

In T41, vehicle 1 detects the pedestrian or the like in motion, for example, and determines whether or not there is a possibility of crossing in front of vehicle 1 by the pedestrian or the like. That is, each processing of S201 and S202 illustrated in FIG. 3 is performed. In a case where it is determined in vehicle 1 that there is a possibility of crossing by the pedestrian or the like, vehicle 1 stops.

In T42, vehicle 1 outputs a voice message or the like to the pedestrian or the like to confirm an intention of crossing.

It is assumed in T43 that vehicle 1 recognizes a voice and/or a gesture from the pedestrian or the like to confirm an intention of crossing. That is, each processing of S203 and S204 (YES) illustrated in FIG. 3 is executed. Note that, vehicle control ECU 7 may operate a function of restraining an erroneous start between T42 and T43.

In T44, vehicle 1 projects the crosswalk pattern on a road surface as a notification to prompt the pedestrian or the like to cross. That is, the processing of S205 illustrated in FIG. 3 is executed. Thereafter, vehicle 1 performs each processing after S206 illustrated in FIG. 3, and continues or terminates the projection of the crosswalk pattern.

FIG. 8 is a diagram illustrating an example of images of the projection of the crosswalk pattern according to the present embodiment. As with FIG. 7, FIG. 8 illustrates processing images in time series in which, when the projection of the crosswalk pattern is started, an intention of the pedestrian or the like is confirmed in advance based on a reaction (a gesture such as body and/or hand gestures or a conversation by voice) of the pedestrian or the like, and the projection of the crosswalk pattern is controlled according to a result of the confirmation.

T51 and T52 are the same as T41 and T42 in FIG. 7, respectively.

It is assumed in T53 that vehicle 1 recognizes a voice and/or a gesture from the pedestrians or the like, and confirms that there is no intention of crossing. That is, each processing of S203 and S204 (NO) illustrated in FIG. 3 is executed.

In T54, vehicle 1 runs at reduced speed and passes through in front of the pedestrian or the like without projecting the crosswalk pattern. Thereafter, the flow returns to the pedestrian detection processing of S201 after S204 (NO) illustrated in FIG. 3.

(Modification)

For example, in a case where it is detected that the pedestrian or the like is crossing, controller 101 may perform control to notify a subsequent vehicle of vehicle 1 to the effect that the pedestrian or the like is crossing.

For example, when each processing of S102 to S105 in FIG. 2 or each processing of S202 to S207 in FIG. 3 is performed, controller 101 may control vehicle control ECU 7 to operate the function of restraining an erroneous start.

For example, in S103 of FIG. 2 or in S205 of FIG. 3, controller 101 may decide a period in which the projection of the crosswalk pattern is executed (hereinafter, the period will be referred to as "projection period" which is an example of a notification period) based on e.g. a road width and/or a predicted speed of crossing of the pedestrian or the like. For example, controller 101 may set the projection period longer with a wider road width and/or with a slower predicted speed of crossing of the pedestrian or the like.

For example, controller 101 may perform control to count down the projection period.

For example, controller 101 may control DMD 5 to project information indicative of a remaining projection period in the vicinity of the crosswalk pattern. In this case, controller 101 may project a number indicative of the remaining projection period or may project a bar graph which becomes shorter depending on the remaining projection period.

For example, controller 101 may set a disappearance grace period (an example of grace period) for the crosswalk pattern. The disappearance grace period is a period from expiration of the projection period to termination of the projection of the crosswalk pattern. Then, controller 101 may perform control to change an aspect of the projection of the crosswalk pattern during the disappearance grace period to an aspect different from an aspect of the projection of the crosswalk pattern during the projection period. Examples of the aspects of the projection of the crosswalk pattern include projection intensity, color, lighting projection (projection to light the crosswalk pattern), blinking projection (projection to blink the crosswalk pattern), and the like.

For example, controller 101 may reduce the projection intensity of the crosswalk pattern in accordance with a remaining period of the disappearance grace period (hereinafter, the remaining period will be referred to as "remaining disappearance grace period"). Alternatively, controller 101 may change lighting of the crosswalk pattern to blinking in accordance with the remaining disappearance grace period. Alternatively, controller 101 may change a blinking interval of the crosswalk pattern in accordance with the remaining disappearance grace period. Alternatively, controller 101 may vary the color of the crosswalk pattern in accordance with the remaining disappearance grace period.

Note that, the information processing apparatus according to the present embodiment is not limited to the configuration as notification control ECU 10 included in on-vehicle system 2 illustrated in FIG. 1, and can also be implemented as a cloud cooperation system. For example, various information processing performed by intention discriminator 102, characteristic identifier 103, situation detector 104, crossing possibility determiner 105, intention confirmer 106, and the like as described above may also be implemented on a cloud server. For example, interpretation processing of a situation and an intention of the pedestrian or the like, image processing or voice processing associated with the interpretation processing, or information processing in which behavior toward the pedestrian or the like or a content of information to be presented to the pedestrian or the like is decided based on a result of the interpretation processing of the situation and the intention of the pedestrian or the like may be executed by using an AI (Artificial Intelligence) function provided on a cloud server or by using any other information processing engine.

Further, for example, traffic situation acquirer 108 may appropriately collect topical, local information around a running vehicle, for example, based on inter-vehicle communication or the like. Further, for example, traffic situation acquirer 108 may acquire wide-area information from various traffic information (operation information, regulation information, or the like) to be collected and updated at predetermined intervals on a cloud server.

Further, the configuration of the present embodiment (for example, the configuration illustrated in FIG. 1) is particularly suitable for a self-driving vehicle, but may be operated as an assisting function in a case where the driver performs the driving manually. It is needless to say that the configuration of the present embodiment is not particularly limited.

<Summary of Present Embodiment>

The contents of the present embodiment can be expressed as follows.

The information processing apparatus according to the present embodiment includes: a controller that controls a notification to be made by a notification apparatus that prompts a notification target person to cross; and an intention discriminator that discriminates an intention of crossing of the notification target person with respect to the notification, wherein the controller controls the notification apparatus to stop the notification in a case where the intention discriminator discriminates that the notification target person has no intention of crossing.

Further, the information processing method according to the present embodiment includes: controlling a notification to be made by a notification apparatus that prompts a notification target person to cross; and discriminating an intention of crossing of the notification target person with respect to the notification, wherein in the controlling, the notification apparatus is controlled to stop the notification in a case where it is discriminated in the discriminating that the notification target person has no intention of crossing.

Further, the recording medium according to the present embodiment is a recording medium recording a program to be executed by a computer, the program comprising: controlling a notification to be made by a notification apparatus that prompts a notification target person to cross, and discriminating an intention of crossing of the notification target person with respect to the notification, wherein in the controlling, the notification apparatus is controlled to stop the notification in a case where it is discriminated in the discriminating that the notification target person has no intention of crossing.

The information processing apparatus (for example, notification control ECU 10), the information processing method, or the recording medium according to the present embodiment as described above does not unilaterally determine an intention of the notification target person, but discriminates an intention of the notification target person based on a reaction of the notification target person to the notification. As a result, in a case where it is discriminated that the notification target person has no intention of crossing, the notification is stopped. Further, e.g. in a case where the notification target person that has started crossing once returns or the like, it is possible to discriminate a changed intention of crossing.

Thus, according to vehicle 1 including the information processing apparatus, the information processing method, or the recording medium according to the present embodiment, it is possible to discriminate an intention of crossing by sufficient communication between vehicle 1 and the notification target person. Accordingly, the notification target person (for example, the pedestrian or the like) can more safely cross the crosswalk pattern projected by vehicle 1.

In addition, the information processing apparatus according to the present embodiment may further include a situation detector that detects a situation in which the notification target person is crossing, wherein the controller may control, based on a detection result by the situation detector, the notification apparatus to continue the notification while the notification target person is crossing.

Thus, in a case where the notification target person is crossing, the notification such as the projection of the crosswalk pattern is continued. Accordingly, it is possible to further enhance the safety of the notification target person.

Further, in the information processing apparatus according to the present embodiment, in a case where the situation detector detects a person attempting to cross other than the notification target person while the notification target person is crossing, the controller may control the notification apparatus to continue the notification until both the notification target person and the crossing person finish crossing.

Thus, in a case where a situation in which the crossing person (the new pedestrian or the like described above) other than the notification target person start crossing occurs while the notification target person is crossing, the notification such as the projection of the crosswalk pattern is continued. Accordingly, it is also possible to enhance the safety of the crossing person other than the notification target person.

In addition, the information processing apparatus according to the present embodiment may further include a characteristic identifier that identifies a characteristic of the notification target person, wherein the controller may control the notification apparatus to change an aspect of the notification in accordance with the characteristic of the notification target person identified by the characteristic identifier.

Thus, the information processing apparatus according to the present embodiment is capable of performing not only the projection of the crosswalk pattern, but also voice output or the like in accordance with the characteristic (with a walking stick, being blind, using a wheelchair, or the like) of the notification target person. Accordingly, the information processing apparatus according to the present embodiment is capable of performing an appropriate notification in accordance with the characteristic of each notification target person.

In addition, the information processing apparatus according to the present embodiment may further include: a detector that detects a notification target candidate; a crossing possibility determiner that determines a possibility of crossing by the notification target candidate; and an intention confirmer that confirms an intention of crossing of the notification target person in a case where the crossing possibility determiner determines that there is a possibility of crossing by the notification target candidate and the notification target candidate is assigned as the notification target person, wherein the controller may control the notification apparatus to perform the notification in a case where the intention confirmer confirms an intention of crossing of the notification target person.

Thus, in a case where the notification target candidate is detected and it is judged that there is a possibility of crossing by the notification target candidate, the information processing apparatus according to the present embodiment decides the notification target candidate as the notification target person, and reconfirms whether or not the notification target person has an intention of crossing. Then, the information processing apparatus according to the present embodiment is capable of performing the notification such as crosswalk projection after the confirmation of an intention of crossing of the notification target person. Accordingly, since an intention of the notification target person can be accurately confirmed, it is possible to further enhance the safety of the notification target person.

Further, in the information processing apparatus according to the present embodiment, in a case where the crossing possibility determiner determines that there is a possibility of crossing by the notification target candidate, the controller may control a predetermined control apparatus (for example, vehicle control ECU 7) to perform control to restrain an erroneous start.

Thus, in a case where it is determined that there is a possibility of crossing by the notification target candidate, an erroneous start is restrained. Accordingly, it is possible to prevent an accident from occurring when confirming an intention of crossing or the like.

Further, the information processing apparatus according to the present embodiment may further include a storage storing at least one of a frequency that the crossing possibility determiner performs determination and a threshold value for determining that there is a possibility of crossing with respect to an index value used in the determination by the crossing possibility determiner, wherein the crossing possibility determiner may determine a possibility of crossing by the notification target candidate based on at least one of the frequency and the threshold value stored in the storage.

Thus, a user (for example, an occupant) of the vehicle can adjust, for example, the frequency that the crossing possibility determiner performs the determination and/or the index value such as a probability of judging that there is a possibility of crossing. For example, in case of emergency such as transportation of a sudden sick person, the user of the vehicle sets the frequency that the crossing possibility determiner performs the determination low or sets the index value of a criterion for judgment of a possibility of crossing high, for example. Thus, it is possible to adjust the number of times when the vehicle stops as a result of determination that there is a possibility of crossing by the notification target candidate.

Further, the information processing apparatus according to the present embodiment may further include a target time receiver that receives an input of a target time of arrival at a destination; a traffic situation acquirer that acquires information on traffic situation around a route to the destination; and an adjuster that adjusts at least one of the frequency and the threshold value by using at least one of the target time of arrival received by the target time receiver and the information on traffic situation acquired by the traffic situation acquirer, wherein the crossing possibility determiner may determine a possibility of crossing by the notification target candidate based on at least one of the frequency and the threshold value adjusted by the adjuster.

Thus, the frequency that the crossing possibility determiner performs the determination and the index value of the criterion for judgment of a possibility of crossing are automatically adjusted based on at least one of the target time of arrival input by the user of the vehicle and the information (for example, information such as a dynamic map) on traffic situation around the route to the destination so that the vehicle can arrive by the target time of arrival. Accordingly, the number of times when the vehicle stops as a result of determination that there is a possibility of crossing by the notification target candidate can be adjusted depending on circumstances of the user of the vehicle.

Further, in the information processing apparatus according to the present embodiment, the controller may control at least one of irradiation of light from a light irradiation apparatus as the notification apparatus and output of a voice from a voice output apparatus as the notification apparatus.

Thus, for example, in a case where a voice is output, a notification target person with poor vision can cross safely based on the voice.

Further, in the information processing apparatus according to the present embodiment, the controller may set a grace period that is a period from expiration of a notification period set as a period, during which the notification is executed, to termination of the notification, and may control the notification apparatus to change an aspect of the notification during the grace period to an aspect different from an aspect of the notification during the notification period.

Thus, the notification target person can know that the crosswalk pattern disappears soon by visually recognizing a change in an aspect of the projection of the crosswalk pattern. Accordingly, it is possible to allow the notification target person to cross smoothly and safely.

Further, in the information processing apparatus according to the present embodiment, the controller may control the notification apparatus to change the aspect of the notification during the grace period in accordance with a remaining period of the grace period.

Thus, the notification target person can know that a remaining period until the crosswalk pattern disappears becomes shorter by visually recognizing a change in an aspect of the projection of the crosswalk pattern. Accordingly, it is possible to allow the notification target person to cross smoothly and safely.

The present embodiment may be implemented by software, hardware, or software in cooperation with hardware. Further, software may also be recorded as a computer program in a predetermined recording medium (computer-readable recording medium) and provided to the user.

Each functional block used in the description of the embodiment may be partially or entirely implemented as an LSI that is an integrated circuit, and each process described in the embodiment may be partially or entirely controlled by one LSI or a combination of LSIs. The LSI may be configured from individual chips, or may be configured from one chip so as to include some or all of the functional blocks. The LSI may be provided with data input and output. The LSI may also be referred to as an IC, a system LSI, a super LSI, or an ultra LSI depending on the difference in degree of integration.

The method for implementing an integrated circuit is not limited to the LSI, and the integrated circuit may be implemented with a dedicated circuit, a general-purpose processor, or a dedicated processor. Further, an FPGA (Field Programmable Gate Array) that can be programmed after the LSI is produced or a reconfigurable processor with which the connections and settings of circuit cells in the inside of the LSI are reconfigurable may also be utilized. The present embodiment may be implemented as digital processing or analog processing.

Further, when a technology for implementing an integrated circuit that substitutes the LSI appears in accordance with the advancement of the semiconductor technology or other derivative technologies, the functional blocks may be integrated by using the above technology as a matter of course. The application of biotechnology or the like may be possible.

The present embodiment can be implemented in any types of apparatuses, devices, systems (collectively referred to as communication apparatuses). Non-limiting examples of the apparatuses include telephones (mobile phones, smart phones, and the like), tablets, personal computers (PCs) (laptops, desktops, notebooks, and the like), cameras (digital still/video cameras, and the like), digital players (digital audio/video players, and the like), wearable devices (wearable cameras, smart watches, tracking devices, and the like), game consoles, digital book readers, tele-health tele-medicine (remote health care medicine prescription) devices, vehicles or moving and/or transportation engines (automobiles, airplanes, ships, and the like) having communication functions, and combinations of various kinds of apparatuses described above.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2019-153501, filed on Aug. 26, 2019, the disclosure of which including the specification, drawings and abstract is incorporated herein by reference in its entirety.

INDUSTRIAL APPLICABILITY

One aspect of the present disclosure is useful for on-vehicle systems.

REFERENCE SIGNS LIST

1 Vehicle
2 On-vehicle system
3 Camera apparatus
4 Radar apparatus
5 DMD
6 Wireless communication apparatus
7 Vehicle Control ECU
8 Speaker/microphone apparatus
9 Object detector
10 Notification control ECU
11 Communication I/F
12 Memory 13 Processor
14 Internal bus
101 Controller
102 Intention discriminator
103 Characteristic identifier
104 Situation detector
105 Crossing possibility determiner
106 Intention confirmer
107 Target time receiver
108 Traffic situation acquirer
109 Adjuster

The invention claimed is:

1. An information processing apparatus, comprising:
a controller that controls a notification to be made by a notification circuit that prompts a notification target person to cross;
a processor that discriminates an intention of crossing of the notification target person with respect to the notification, wherein
the controller controls the notification circuit to stop the notification in a case where the processor discriminates that the notification target person has no intention of crossing;
a detector that detects a notification target candidate,
wherein the processor determines a possibility of crossing by the notification target candidate,
the processor confirms the intention of crossing of the notification target person in a case where the processor determines that there is the possibility of crossing by the notification target candidate and the notification target candidate is assigned as the notification target person,
the controller controls the notification circuit to perform the notification in a case where the processor confirms the intention of crossing of the notification target person,
in a case where the processor determines that there is the possibility of crossing by the notification target candidate, the controller controls a predetermined control apparatus to perform control to restrain an erroneous start; and
a storage storing at least one of a frequency that the processor performs determination of the possibility of crossing by the notification target candidate and a threshold value for determining that there is the possibility of crossing with respect to an index value used in the determination of the possibility of crossing by the notification target candidate, wherein
the processor determines the possibility of crossing by the notification target candidate based on at least one of the frequency and the threshold value stored in the storage,
the processor receives an input of a target time of arrival at a destination,
the processor acquires information on traffic situation around a route to the destination,
the processor adjusts at least one of the frequency and the threshold value by using at least one of the target time of arrival received and the information on traffic situation acquired, and
the processor determines the possibility of crossing by the notification target candidate based on at least one of the frequency and the threshold value adjusted.

2. The information processing apparatus according to claim 1, further comprising a situation detector that detects a situation in which the notification target person is crossing, wherein
the controller controls, based on a detection result by the situation detector, the notification circuit to continue the notification while the notification target person is crossing.

3. The information processing apparatus according to claim 2, wherein
in a case where the situation detector detects a person attempting to cross other than the notification target person while the notification target person is crossing, the controller controls the notification circuit to continue the notification until both the notification target person and the crossing person finish crossing.

4. The information processing apparatus according to claim 1, wherein the processor identifies a characteristic of the notification target person, and
the controller controls the notification circuit to change an aspect of the notification in accordance with the characteristic of the notification target person identified by the processor.

5. The information processing apparatus according to claim 1, wherein
the controller controls at least one of irradiation of light from a light irradiation apparatus as the notification circuit and output of a voice from a voice output apparatus as the notification circuit.

6. The information processing apparatus according to claim 1, wherein
the controller sets a grace period that is a period from expiration of a notification period set as a period, during which the notification is executed, to termination of the notification, and controls the notification circuit to change an aspect of the notification during the grace period to an aspect different from an aspect of the notification during the notification period.

7. The information processing apparatus according to claim 6, wherein
the controller controls the notification circuit to change the aspect of the notification during the grace period in accordance with a remaining period of the grace period.

8. An information processing method, comprising:
controlling a notification to be made by a notification circuit that prompts a notification target person to cross;
discriminating, by a processor, an intention of crossing of the notification target person with respect to the notification, wherein
in the controlling, the notification circuit is controlled to stop the notification in a case where it is discriminated in the discriminating that the notification target person has no intention of crossing;
detecting a notification target candidate;
determining a possibility of crossing by the notification target candidate;
confirming the intention of crossing of the notification target person in a case where the determining determines that there is the possibility of crossing by the notification target candidate and the notification target candidate is assigned as the notification target person;
controlling the notification circuit to perform the notification in a case where the confirming confirms the intention of crossing of the notification target person,
in a case where the determining determines that there is the possibility of crossing by the notification target candidate, controlling a predetermined control apparatus to perform control to restrain an erroneous start;
storing at least one of a frequency that the processor performs determination of the possibility of crossing by the notification target candidate and a threshold value for determining that there is the possibility of crossing with respect to an index value used in the determination of the possibility of crossing by the notification target candidate, wherein the determining determines the possibility of crossing by the notification target candidate based on at least one of the frequency and the threshold value stored in the storing;

receiving an input of a target time of arrival at a destination;

acquiring information on traffic situation around a route to the destination; and adjusting at least one of the frequency and the threshold value by using at least one of the target time of arrival received and the information on traffic situation acquired, wherein the determining determines the possibility of crossing by the notification target candidate based on at least one of the frequency and the threshold value adjusted.

9. A non-transitory recording medium recording a program to be executed by a computer having a processor, the program comprising:

controlling a notification to be made by a notification circuit that prompts a notification target person to cross, and discriminating an intention of crossing of the notification target person with respect to the notification, wherein in the controlling, the notification circuit is controlled to stop the notification in a case where it is discriminated in the discriminating that the notification target person has no intention of crossing, detecting a notification target candidate;

determining a possibility of crossing by the notification target candidate;

confirming the intention of crossing of the notification target person in a case where the determining determines that there is the possibility of crossing by the notification target candidate and the notification target candidate is assigned as the notification target person;

controlling the notification circuit to perform the notification in a case where the confirming confirms the intention of crossing of the notification target person, in a case where the determining determines that there is the possibility of crossing by the notification target candidate, controlling a predetermined control apparatus to perform control to restrain an erroneous start;

storing at least one of a frequency that the processor performs determination of the possibility of crossing by the notification target candidate and a threshold value for determining that there is the possibility of crossing with respect to an index value used in the determination of the possibility of crossing by the notification target candidate, wherein the determining determines the possibility of crossing by the notification target candidate based on at least one of the frequency and the threshold value stored in the storing;

receiving an input of a target time of arrival at a destination;

acquiring information on traffic situation around a route to the destination; and adjusting at least one of the frequency and the threshold value by using at least one of the target time of arrival received and the information on traffic situation acquired, wherein the determining determines the possibility of crossing by the notification target candidate based on at least one of the frequency and the threshold value adjusted.

* * * * *